(12) United States Patent
Tiberghien et al.

(10) Patent No.: US 11,149,891 B2
(45) Date of Patent: Oct. 19, 2021

(54) QUICK COUPLING FOR THE DETACHABLE CONNECTION OF TWO PIPES THROUGH WHICH A PRESSURIZED FLUID FLOWS

(71) Applicant: STAUBLI FAVERGES, Faverges-Seythenex (FR)

(72) Inventors: Alain-Christophe Tiberghien, Sevrier (FR); Christophe Durieux, Gilly sur Isere (FR); Serafim Marques-Barroca, Frontenex (FR); Olivier Pastore, Ugine (FR); Olivier Poly, Chavanod (FR); Igor Bahno, Ugine (FR); Romain Mayer, Hery sur Ugine (FR)

(73) Assignee: STAUBLI FAVERGES FAV, Erges-Seythenex (FR)

( * ) Notice: Subject to any disclaimer, the term of this patent is extended or adjusted under 35 U.S.C. 154(b) by 90 days.

(21) Appl. No.: 16/518,270

(22) Filed: Jul. 22, 2019

(65) Prior Publication Data
US 2020/0032942 A1 Jan. 30, 2020

(30) Foreign Application Priority Data
Jul. 24, 2018 (FR) ........................................ 1856849

(51) Int. Cl.
*F16L 37/40* (2006.01)
(52) U.S. Cl.
CPC .................................. *F16L 37/40* (2013.01)
(58) Field of Classification Search
CPC ...................................................... F16L 37/40
USPC .................................................... 137/614.03
See application file for complete search history.

(56) References Cited

U.S. PATENT DOCUMENTS 9,032,997 B2 * 5/2015 Abura et al. ............ F16L 37/34
137/614.02

FOREIGN PATENT DOCUMENTS

| EP | 0477949 A1 | 4/1992 |
| EP | 2048425 A1 | 4/2009 |
| EP | 3255332 A1 | 12/2017 |
| FR | 2861159 A1 | 4/2005 |

OTHER PUBLICATIONS

International Search Report, FR1856849, dated May 17, 2019, 2 Pages.

* cited by examiner

*Primary Examiner* — Kevin L Lee (57) ABSTRACT

The invention relates to a quick coupling, made up of a male element and a female element. The male element includes a cylindrical male body, defining a longitudinal cavity, a distal mouth, and a valve movable axially inside the cavity between a forward position in which the valve closes off the mouth and a withdrawn position in which the valve does not close off the mouth. The female element includes a cylindrical female body, defining a longitudinal cavity and a distal mouth, a push-piece, and a slide valve. The male body or the push-piece delimits a fluid passage channel connecting an inside of the cavity to the distal mouth, and the passage channel, emerging inside the cavity of the male element or the female element, fits inside a circle, the diameter of which is respectively larger or smaller than that of the first and second sealing gaskets.

13 Claims, 10 Drawing Sheets

QUICK COUPLING FOR THE DETACHABLE CONNECTION OF TWO PIPES THROUGH WHICH A PRESSURIZED FLUID FLOWS

CROSS-REFERENCE TO RELATED APPLICATION

This application claims priority to French patent application no. 1856849, filed on Jul. 24, 2018.

BACKGROUND OF THE INVENTION

Field of the Invention

The present invention relates to a quick coupling for the detachable connection of two pipes through which a pressurized fluid flows.

Description of Related Art

In the field of connecting pipes for pressurized fluid, it is known to use a coupling comprising two complementary coupling elements (male and female). The two coupling elements include movable members that push one another, by simple approach of the two coupling elements, to open a fluid stream connecting the passage pipes of the two coupling elements. In practice, there is a sealing element, of the O-ring type, that provides the sealing between the respective ducts of the two coupling elements when it is in contact with the surface, often cylindrical. The fluid stream opens as of the loss of this contact. Therefore, the sealing element is directly exposed to the fluid circulating in the stream in the coupled position of the coupling, and as of the (pressure) balancing of the ducts to be connected. FR 2,861,159 A1 discloses an example coupling of this type.

One problem inherent to the connection of pressurized pipes is that there is often a significant pressure differential between the two pipes to be connected: in general, one of the two pipes is often pressurized during the coupling (usage pressure). Thus, the sealing gasket undergoes significant stresses when the fluid communication between the two coupling elements is established, in particular because the pressure balancing occurs abruptly.

In FR 2,861,159 A1 typically, the sealing gasket is subjected to a pressure peak when the plunger of the female coupling element exceeds the mouth of the complementary male coupling element at a cone, and pushes the male valve back to connect the two pipes. This phase takes place in a so-called balancing configuration that is identified between the beginning of coupling and the total connection phase of the ducts. This is the last sealing barrier between the two ducts to be connected.

During balancing, the pressure exerted on the periphery of the gasket increases abruptly, such that part or all of the gasket is stretched and driven by the pressure against the shoulder of the housing. In the most favorable case, the gasket is located across the inside of its housing, while in the most unfavorable case, the gasket comes completely out of its housing. This positioning defect causes, during the mechanical disconnection of the coupling elements, leaks at the front face of the pressurized coupling element, which for example comes from an incorrect return into position of the sealing elements on the front face. Clearly, this sealing problem can prove damaging, in particular for fragile electronic cooling applications or in case of oil spill on flammable apparatuses.

The exposure of the gaskets in the fluid stream can therefore cause closing and sealing problems upon disconnection of the coupling. In the long term, the partial expulsion of the gasket from its housing can also raise accelerated deterioration problems.

To offset this problem, it is known, for example from EP 2,669,560 A1, to produce a leak at a sealing face in order to discharge the pressurized duct via an additional sealing section, in addition to that providing the sealing of the coupling in the coupled state. This solution requires the creation of a sealing zone and an additional gasket that add design constraints related to the bulk and industrialization constraints. The created leak is dispersed outside the coupling, which is problematic in some applications. Furthermore, the problem of driving of the gasket by the fluid flow rate at the connection is potentially reduced, but not resolved by the pressure decrease.

It is also known from EP 0,477,949 A1 to provide gasket protection suitable for the passage of fluid in the radial direction, but the dynamic friction of which upon each connection on the surfaces of the mechanical parts can be harmful in the lifetime of the gasket.

It is also known from EP 3,227,595 A1 to protect a gasket by creating a passage in a hollow piston of the fluid stream. However, this solution is only applicable to a specific valve configuration.

BRIEF SUMMARY OF THE INVENTION

The invention aims to resolve the aforementioned drawbacks by proposing a new coupling that offsets the abrupt pressure increase situation upon the connection of the two coupling elements, to avoid the temporary or permanent dislocation of the sealing gasket during the pressure balancing.

To that end, the invention relates to a quick coupling for the detachable connection of two pipes through which a pressurized fluid flows, made up of a male element and a female element able to receive the male element by fitting along a longitudinal axis between an uncoupled configuration and a coupled configuration of the coupling.

The male element comprises a cylindrical male body, defining a longitudinal cavity and a distal mouth with a diameter smaller than that of the cavity, a valve axially movable inside the cavity, between a forward position in which it closes off the mouth and a withdrawn position in which it does not close off the mouth, and a first sealing gasket that is borne by the male body or the valve, and which bears respectively on the valve or on an inner cylindrical wall of the male body.

The female element comprises a cylindrical female body, defining a longitudinal cavity and a distal mouth with a diameter smaller than or equal to that of the cavity, a push-piece, and a slide valve, which is arranged radially between the female body and the push-piece and which is movable axially inside the longitudinal cavity between a forward position, in which it closes off the mouth, and a withdrawn position, in which it does not close off the mouth, and a second sealing gasket that is borne by the slide valve or the push-piece, and which bears respectively on an outer cylindrical wall of the push-piece or on the slide valve.

According to the invention, the male body or the push-piece delimits a fluid passage channel connecting the inside of the cavity to the distal mouth, respectively of the male element or the female element. The passage channel, emerging inside the cavity of the male element or the female element, fits inside a circle, the diameter of which is respectively larger or smaller than that of the first and second sealing gaskets. Therefore, the channel extends between two planes that are perpendicular to the longitudinal axis, respectively between a proximal plane and distal plane, which are offset relative to one another along the longitudinal axis. Therefore, the channel is a slot along the outer cylindrical wall of the push-piece or along the inner cylindrical wall of the male body.

Thus, the invention consists of providing a specific development for the surface in radial contact with the gasket exposed to the pressure of the fluid during balancing. The passage channel(s) make it possible to cause the pressure to drop, without the gasket being abruptly exposed to the pressure from the fluid stream and without creating leaks outside the coupling. Therefore, the effect of the invention is to create a local leak on an internal or external gasket segment before the complete opening of the circuit.

According to advantageous, but optional aspects of the invention, the coupling may include one or more of the following features, considered in any technically allowable combination:

The proximal plane and the distal plane are respectively defined at the cavity and the distal mouth of the male or female element.

In a balancing configuration of the coupling, defined by fitting between the coupled configuration and the uncoupled configuration, one of the gaskets from among the first sealing gasket and the second sealing gasket is arranged between the proximal plane and the distal plane, while the other gasket is inside the cavity of the corresponding male or female element, such that a fluid connection is formed between the cavities of the male and female elements.

The fluid connection between the cavities of the male and female elements is done sealably relative to the outside.

In a balancing position of the coupling, defined between the coupled and uncoupled configurations, the outer cylindrical wall of the push-piece or the inner cylindrical wall of the male body respectively partially retains the first sealing gasket or the second sealing gasket in the radial direction.

The channel extends at least partially along a frustoconical part of the male body or the push-piece.

Several slots are formed along the outer cylindrical wall of the push-piece or the inner cylindrical wall of the male body and are regularly distributed over the circumference of the wall.

The two distal and proximal planes are offset from one another by a distance corresponding to at least a toroid thickness of the first or second sealing gasket.

The two proximal and distal planes are offset from one another by a distance corresponding to one, two, three or four toroid thicknesses.

The push-piece is hollow and comprises a radial opening behind the channel.

The push-piece comprises, in front, a push-piece head able to maintain sealed contact with the valve in the uncoupled position of the coupling and, behind, a tubular part whereof the diameter is smaller than that of the head.

When the male and female elements are in the uncoupled configuration, the first sealing gasket or the second sealing gasket is respectively in contact with the inner cylindrical wall of the male body or the outer cylindrical wall of the push-piece, in front of the distal plane.

The front faces of the male body and the valve, as well as the front faces of the push-piece and the slide valve, are coplanar when the male and female elements are in the uncoupled configuration.

BRIEF DESCRIPTION OF THE SEVERAL VIEWS OF THE DRAWINGS

The invention and other advantages thereof will appear more clearly in light of the following description of four embodiments of a coupling according to its principle, provided solely as an example and done in reference to the appended drawings, in which.

DETAILED DESCRIPTION OF THE INVENTION

FIGS. 1 to 6 show a first embodiment of a quick coupling R for the detachable connection of two pipes C1 and C2 through which a pressurized fluid flows. The pipes C1 and C2 are shown schematically in thin lines in FIGS. 1 and 2.

Advantageously, the coupling R can be used irrespective of the direction of flow of the fluid inside the ducts C1 and C2.

Figure 6:
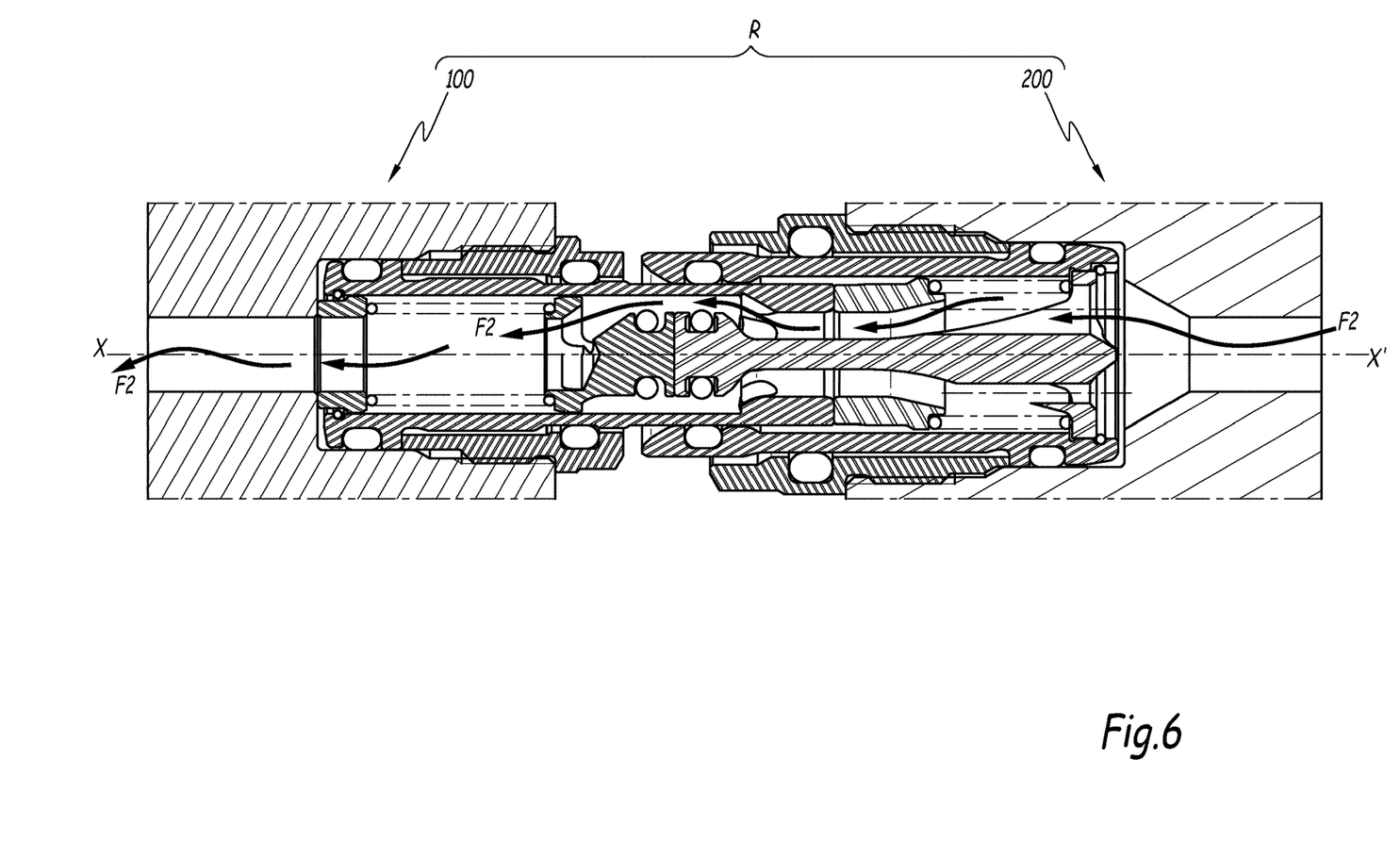
FIG. 6 is a sectional view of the coupling shown in the coupled configuration.

As shown in FIG. 6, the coupling R is made up of a male element 100 and a female element 200 capable of receiving the male element 100 by fitting along the longitudinal axis X-X'.

The invention particularly applies to the configuration where one of the pipes among the pipes C1 and C2 is pressurized, typically at a so-called usage pressure of between 3 and 7 bars, while the other pipe is not pressurized. For example, one of the coupling elements 100 or 200 is fastened sealably to a coolant source and flow rate apparatus (not shown) upstream, and the other element, respectively 200 or 100, to the feed of a device for conducting coolant toward downstream electronic circuits (not shown).

In a coordinate system associated with a coupling element 100 or 200, the "forward" and "distal" directions are defined as directions parallel to the longitudinal axis X-X' and facing toward the complementary coupling element, respectively 200 or 100. Conversely, the "rear" and "proximal" directions are defined as directions parallel to the longitudinal axis X-X' and facing the side opposite the complementary coupling element 200 or 100.

In the example, the rear part of the male element 100 is connected to the pipe C1, while the rear part of the female element 200 is connected to the pipe C2.

Figure 1:
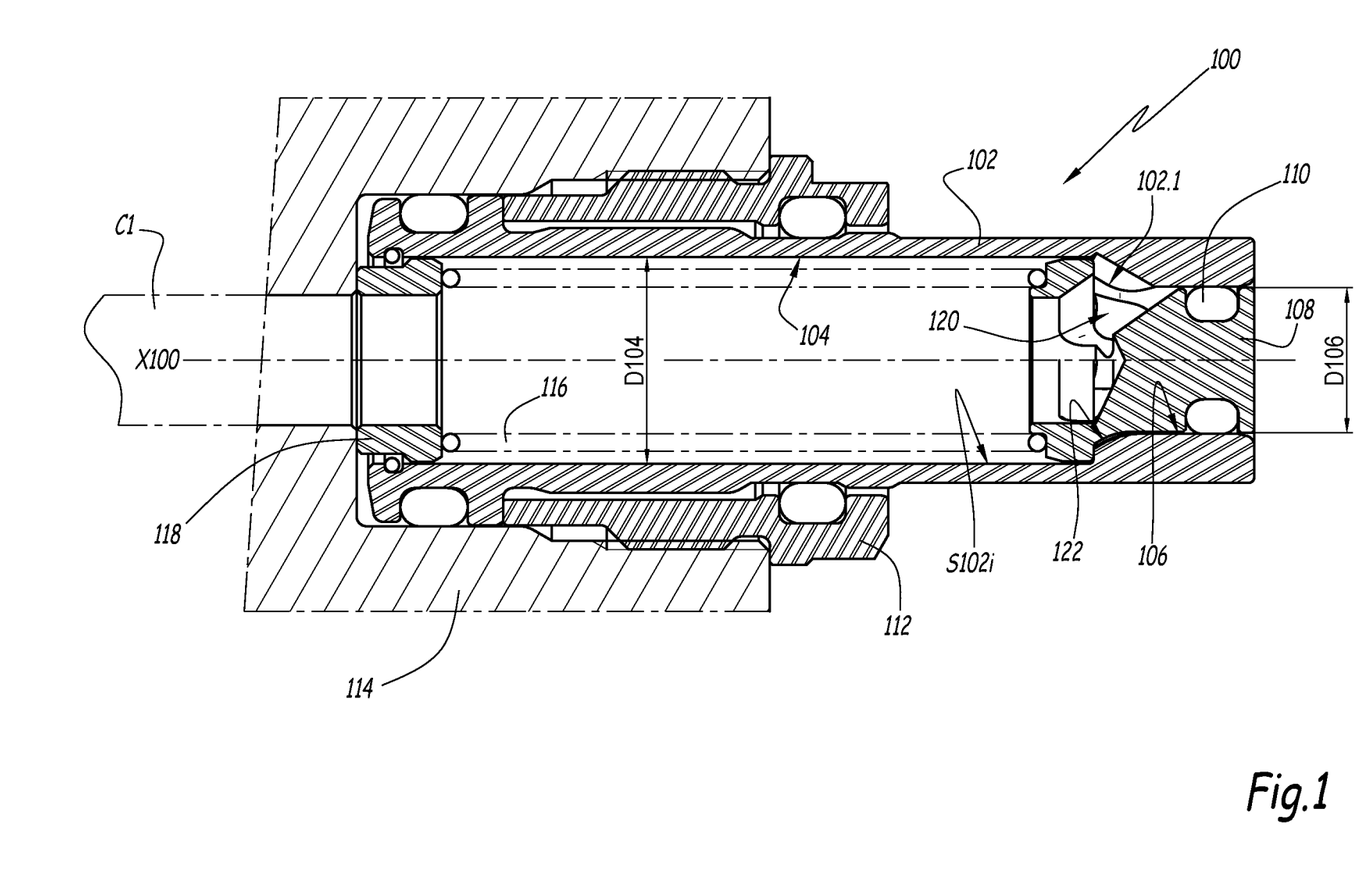
FIG. 1 is a longitudinal sectional view of a first coupling element, respectively of the male element, then in the uncoupled configuration.

As shown in FIG. 1, the male element 100 globally assumes the shape of a cylinder, centered on a longitudinal axis X100.

The male element 100 comprises a cylindrical male body 102, centered on the axis X100 and defining a longitudinal cavity 104 and a distal mouth 106, the diameter D106 of which is smaller than the diameter D104 of the cavity 104.

A nut 112 is positioned coaxially around the male body 102. The nut 112 is screwed inside a tapping defined by a coupling plate 114, described as "downstream plate".

The male element 100 also comprises a valve 108 movable axially, i.e., parallel to the axis X100, inside the cavity 104, between a forward position, shown in FIG. 1, in which it closes off the mouth 106 by sealed contact with an inner cylindrical wall S102i of the male body 102, and a withdrawn position, shown in FIG. 6, for example, in which it does not close off the mouth 106.

A return means 116, typically a spring, returns the valve 108 to the forward position. This means that the return means 116 resiliently loads the valve 108 in the forward direction.

The return means 116 is interposed axially between the valve 108 and a stop 118 positioned, inside the body 102, at the rear end.

Advantageously, the male body 102 defines, on its inner radial surface S102i, a seat 122 against which the valve 108 abuts during the return to the forward position, and also in the uncoupled configuration. This seat 122 is formed by a flared surface, converging in the forward direction. It is thus possible, in a variant, to consider a simple shoulder.

Thus, the surface S102i of the male body defined, from back to front at least by the proximal cavity 104 with diameter D104, which extends, by a frustoconical part reducing the passage section at the valve 108 seat 122, toward the distal mouth 106 whereof the diameter D106 is smaller than that of the cavity 104. The cavity 104 is globally cylindrical and the diameter D104 characterizes the distal section of the surface S102i behind the valve seat 122.

Here, the valve seat 122 separates the cylindrical mouth 106 from the cavity 104, which has a larger diameter.

The male element 100 also comprises a sealing gasket 110, advantageously borne by the valve 108. More specifically, the gasket 110 is mounted inside a peripheral housing, in particular an annular groove, defined on the outer radial surface of the valve 108. Here, the sealing gasket 110 is an O-ring.

The sealing gasket 110 provides the sealed closure of the cavity 104 of the male element 100 by sealed contact between the valve 108 and the body 102, in particular at the distal mouth 106, during its sealed engagement on its seat 122 and its position on the front face.

Sealing gaskets are also provided between the male body 102 and the downstream plate 114 and between the nut 112 and the male body 102.

Figure 3:
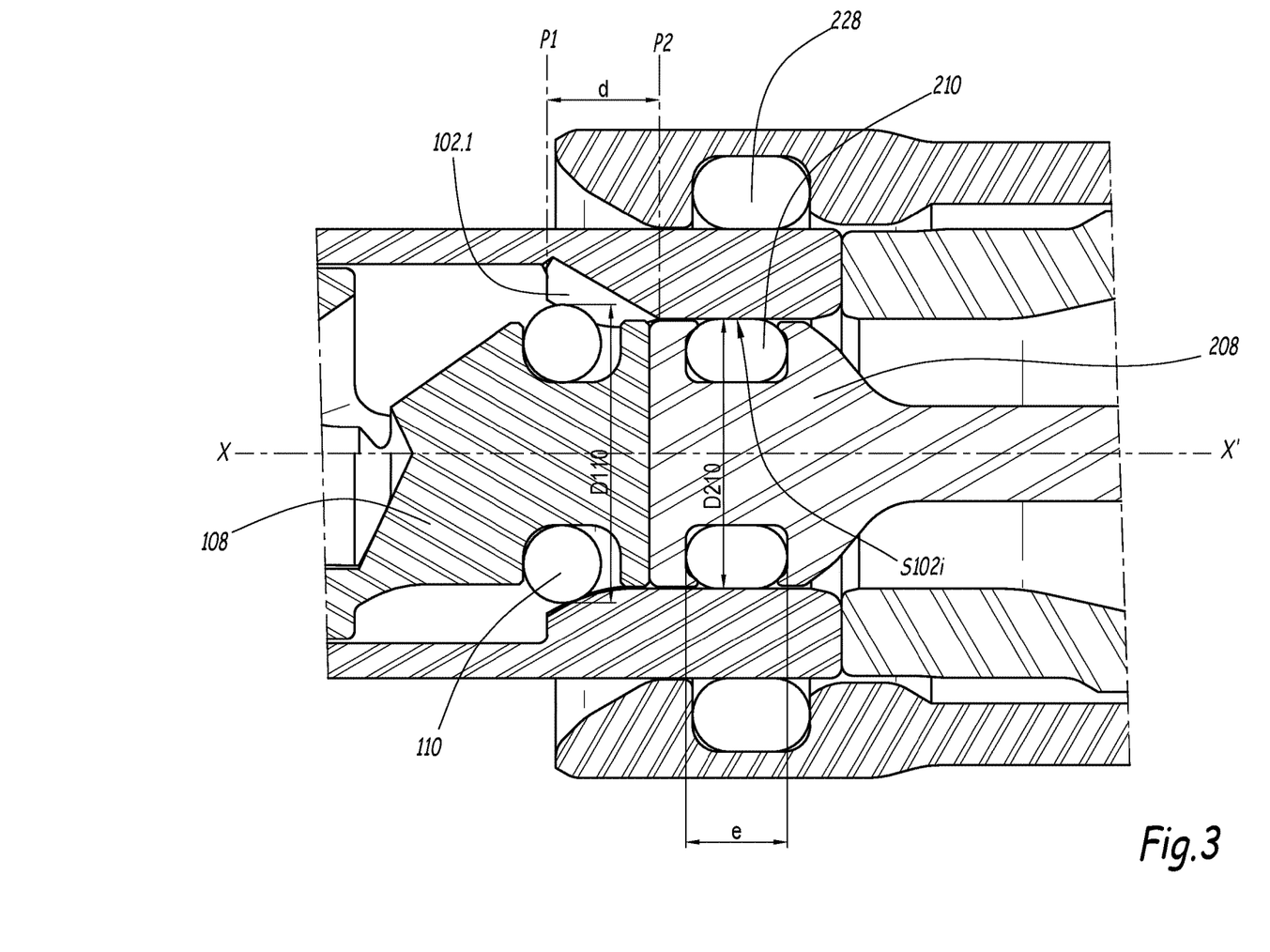
FIG. 3 is a partial sectional view, in the direction of the length, in which the two coupling elements are shown in a first configuration partway between the uncoupled configuration and the coupled configuration.

As shown in FIG. 3, the male body 102 delimits a channel 102.1 connecting the inside of the cavity 104 of the male element 100 to the cylindrical wall of the mouth 106.

The channel is a duct, or local passage, arranged in the male body extending longitudinally between the plane P1 and the plane P2, which does not extend laterally over the entire circumference of the inner surface of the male body. In other words, the passage channel is defined over only an angular sector of the cylindrical wall S102i of the male body 102. The expression "the channel extends between two planes P1 and P2" advantageously means that the channel connects the plane P1 to the plane P2, as shown for example in FIG. 3.

Advantageously, the channel 102.1 is such as a slot formed along the inner cylindrical wall S102i of the male body 102. Preferably, several channels, such as slots, are formed along the inner cylindrical wall S102i of the male body 102 and are regularly distributed over the circumference of the wall S102i over different angular sectors, to produce a fluid passage.

Figure 5:
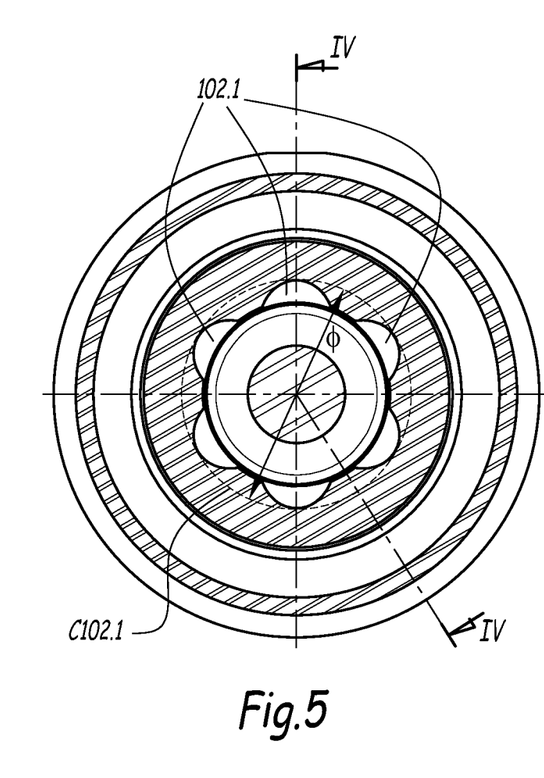
FIG. 5 is a sectional view along line V-V in FIG. 4.

As visible in FIG. 5, the slots 102.1 fit inside a circle C102.1 (circle fitted centered on the axis X100), the diameter ø of which is larger than the diameter D110 of the sealing gasket 110. "Fits inside a circle" here means that in at least one cross-section, it is possible to draw a circle (imaginary), described as fitted circle, that is centered on the longitudinal axis X100 of the coupling element, typically the male element 100, and that surrounds the passage section of each slot 102.1. In the illustration of FIG. 5, for example, there are six slots 102.1 around which it is possible to draw the circle C102.1. Therefore, the surfaces and the lines of the channels, i.e., of the slots, defined in the coupling body, are delimited relative to a circle and defined inside this circle. In FIG. 5, the slot bottoms are for example equidistant from the central axis X100 of the coupling element, such that it is possible to define a fitted circle C102.1 that intersects the bottom of all of the slots.

In an alternative (not shown), it is possible to define a circle centered on the axis that intersects at least one fluid passage slot bottom furthest from the axis, among the slots as far or less far from the axis. Therefore, the depth of the slots 102.1 is not necessarily identical for all of the slots.

The fluid passage channels, i.e., the slots 102.1, extend between two planes that are perpendicular to the longitudinal axis X-X', respectively between a proximal plane P1 and a distal plane P2, which are offset relative to one another along the longitudinal axis X-X'.

Advantageously, each channel 102.1, and in particular each slot, extends longitudinally in a radial plane, i.e., a plane passing through the longitudinal axis X-X'. However, in a variant that is not shown, the fluid passage channel 102.1, in particular each slot, could extend in a plane oblique to said radial plane.

Preferably, the proximal plane P1 and the distal plane P2 are respectively defined at the cavity 104 and the distal mouth 106 of the male element 100.

According to one preferred embodiment, the two proximal and distal planes P1 and P2 are offset from one another by a distance corresponding to at least a toroid thickness e of the sealing gasket 110. Still more advantageously, the distanced corresponds to one, two, three or four toroid thicknesses e. The toroid thickness e is measured parallel to the longitudinal axis X100 or X-X'.

In the embodiment of the figures, each fluid passage channel, i.e., the slots 102.1, extend at least partially along a flared, or frustoconical, portion of the male body 102. Therefore, the two planes P1 and P2 are preferably defined at this frustoconical portion. Typically, this flared or frustoconical portion converges in the forward direction. It is in fact a seat 122 for receiving the valve 108.

Advantageously, when the male and female elements are in the uncoupled configuration, the sealing gasket 110 is in sealed contact with the inner cylindrical wall S102i of the male body 102, in front of the distal plane P2. The inner cylindrical wall S102i, at the mouth 106, forms a surface that is in radial contact with the gasket 110 to provide this sealing. In the uncoupled configuration, the passage channel 102.1 advantageously emerges at the mouth, behind the sealed radial contact between the cylindrical wall S102i and the gasket 110. In the coupled configuration of the male and female elements, the gasket 110 loses sealed radial contact with the cylindrical wall S102i such that the gasket is in contact with, and exposed to, the fluid stream.

Figure 2:
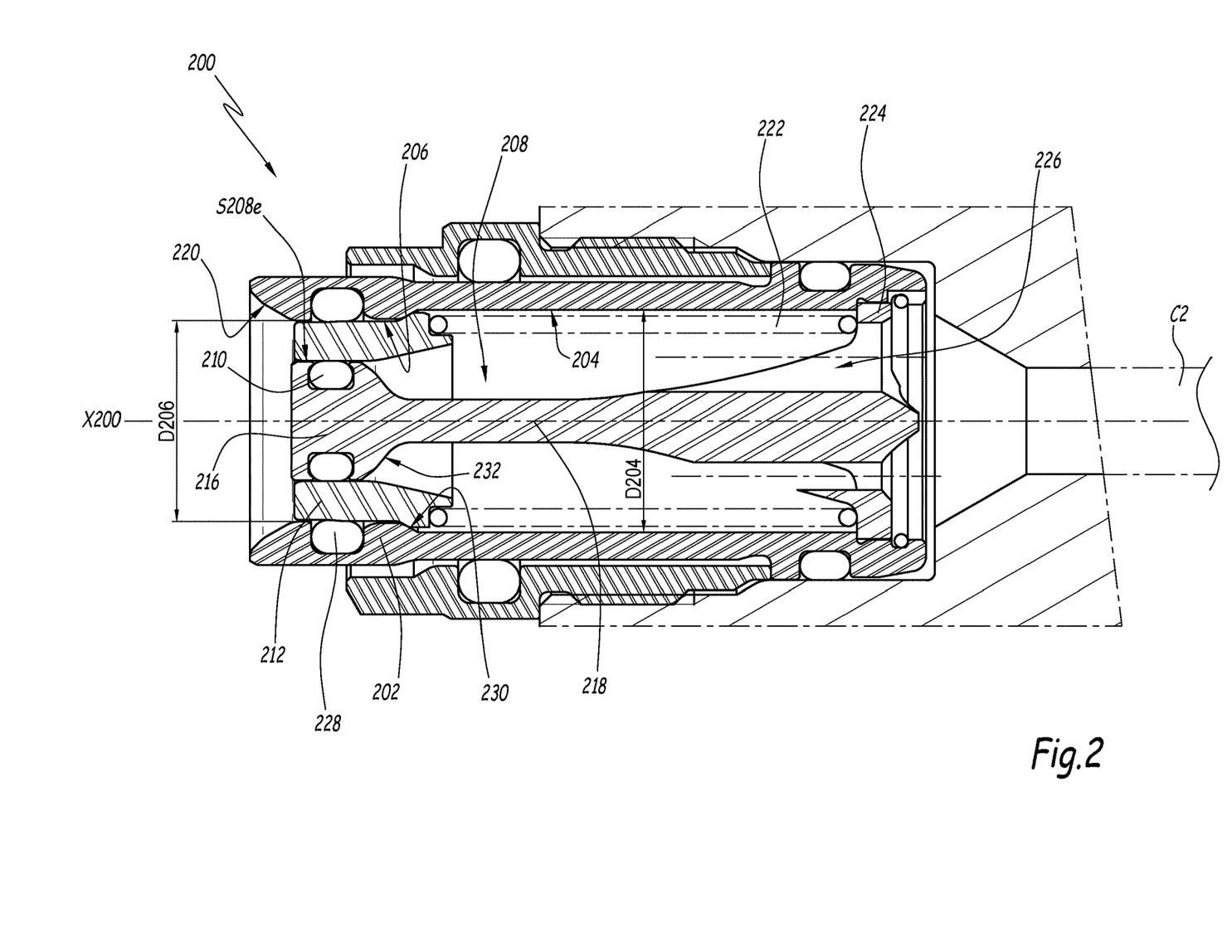
FIG. 2 is a longitudinal sectional view of the second coupling element, respectively of the female element, then in the uncoupled configuration.

As shown in FIG. 2, the female element 200 globally assumes the shape of a cylinder, centered on a longitudinal axis X200.

The female element 200 comprises a cylindrical female body 202, centered on the axis X200 and defining a longitudinal cavity 204 and a distal mouth 206, the diameter D206 of which is smaller than the diameter D204 of the cavity 204.

A push-piece 208 (or piston) is positioned at the center of the female body 202. Advantageously, the push-piece 208 comprises, in front, a push-piece head 216 able to maintain sealed contact with a slide valve 212 of the female element 200 in the uncoupled position of the coupling and, behind, a tubular part 218 (or central rod) whereof the diameter is smaller than that of the head 216. Typically, the push-piece 208 delimits a solid frustoconical section 232 that extends the push-piece head 216 toward the rear in a central rod 218 of smaller diameter.

The slide valve 212 is arranged radially between the female body 202 and the push-piece 208. This slide valve 212 is axially movable inside the longitudinal cavity 204 between a forward position, shown in FIG. 2, in which it closes off the mouth 206 by sealed contact with an outer cylindrical wall S208e of the push-piece 208, and a withdrawn position, shown in FIG. 6 for instance, in which it does not close off the mouth 206. In the forward position, the slide valve 212 advantageously extends radially around the head 216 of the push-piece 208 to close off the mouth 206.

Thus, the outer surface S208e of the push-piece is defined, from back to front, at least by the central rod 218, which extends by a frustoconical part reducing the passage section in the plane of the valve 212 seat 230, toward the head 216 whereof the diameter is greater than that of the rod 218.

A return means 222, typically a spring, recalls the slide valve 212 to the forward position. This means that the return means 222 resiliently loads the slide valve 212 in the forward direction.

Advantageously, the female body 202 defines, on its inner radial surface, a seat 230 against which the slide valve abuts during the return to the forward position, and also in the uncoupled configuration. This seat 230 is formed by a frustoconical surface, converging in the forward direction. It is thus possible, in a variant, to consider a simple shoulder.

The return means 222 is interposed axially between the slide valve 212 and a stop 224 positioned, at the rear end, inside the body 202 between a shoulder and a shank of the body. Preferably, the stop 224 and the push-piece 208 are in one piece.

The push-piece 208 advantageously bears a sealing gasket 210. More specifically, the gasket 210 is mounted inside a peripheral housing, in particular an annular groove, defined on the outer radial surface of the push-piece 208. Here, the sealing gasket 210 is an O-ring.

In particular, the gasket 210 is borne by a part of the outer cylindrical wall S208e of the push-piece 208 radially delimiting the head 216.

Preferably, the female body 202 comprises a front end whereof the inner radial surface 220 is frustoconical and flared in the forward direction. This funnel shape facilitates the fitting of the female element 200 around the male element 100 during the coupling, and in particular at the beginning, during the approach of the two coupling elements.

Advantageously, the front faces of the male body 102 and the valve 108, as well as the front faces of the push-piece 208 and the slide valve 212, are coplanar when the male and female elements are in the uncoupled configuration. This is referred to as a coupling with a planar face or flush faces. Nevertheless, it is obvious that the invention also applies to other types of couplings.

In the example, the push-piece 208 and the valve 108 include a solid part with a conical flare open in the rear part. In other words, the push-piece 208 and the valve 108 each comprise at least one opening, respectively 226 and 120, through which the fluid circulates in the coupled configuration of the coupling. In both cases, the openings 226 and 120 are defined inside a flared part, respectively of the push-piece 208 and the valve 108.

Preferably, an O-ring 228 is positioned inside an annular groove delimited by the inner radial surface of the female body 202. In the uncoupled position of the coupling, when the slide valve 212 bears on the seat 230 of the body 202, the gasket 210 is substantially in the same plane as the gasket 228, such that the two gaskets perform their sealing function at the same time during the separation of the two coupling elements 100 and 200 and the fluid communication between the two coupling elements is closed in a time.

Hereinafter, the operation of the coupling is described, in particular the coupling phase of the male and female coupling elements 100 and 200.

In the uncoupled position, the movable closing members of each of the male and female elements, respectively the valve 108 and the slide valve 212, sealably close off the cavities (or enclosures) 104 and 204 of the elements. Specifically, regarding the male element, the sealing barrier before the placement in communication, or connection, of the enclosures 104 and 204 is a curved (circular or elliptical, for example) and closed sealing section between the body 102 and the valve 108. Regarding the female element, the sealing barrier before the placement in communication, or connection, of the enclosures 104 and 204 is formed by two sealing sections, also curved and closed (circular or elliptical, for example), respectively between the slide valve 212 and the push-piece 208 and between the slide valve 212 and the female body 202. In the example, and as mentioned supra, O-rings are used.

The first phase of the coupling consists of bringing the elements 100 and 200 close to one another, and in particular bringing the distal ends of the two elements close to one another. In the preferred embodiment of the figures, the coupling elements 100 and 200 can be coupled to one another irrespective of the relative angular indexing (or orientation) between the two coupling elements.

Hereinafter, the male body 102 penetrates inside the female body 202, with guiding along the inner radial surface 220. The axes X100 and X200 are then superimposed with the longitudinal axis X-X'. Therefore, the guiding remains guaranteed in the same manner as the couplings of the state of the art.

By coupling the two elements 100 and 200 along the fitting axis X-X', the component members of the two coupling elements push one another back while maintaining the sealing of each of the enclosures 104 and 204. Specifically, the push-piece 208 pushes the valve 108, while the slide valve 212 is pushed back by the male body 102. The coupling is then in the configuration of FIG. 3.

Figure 4:
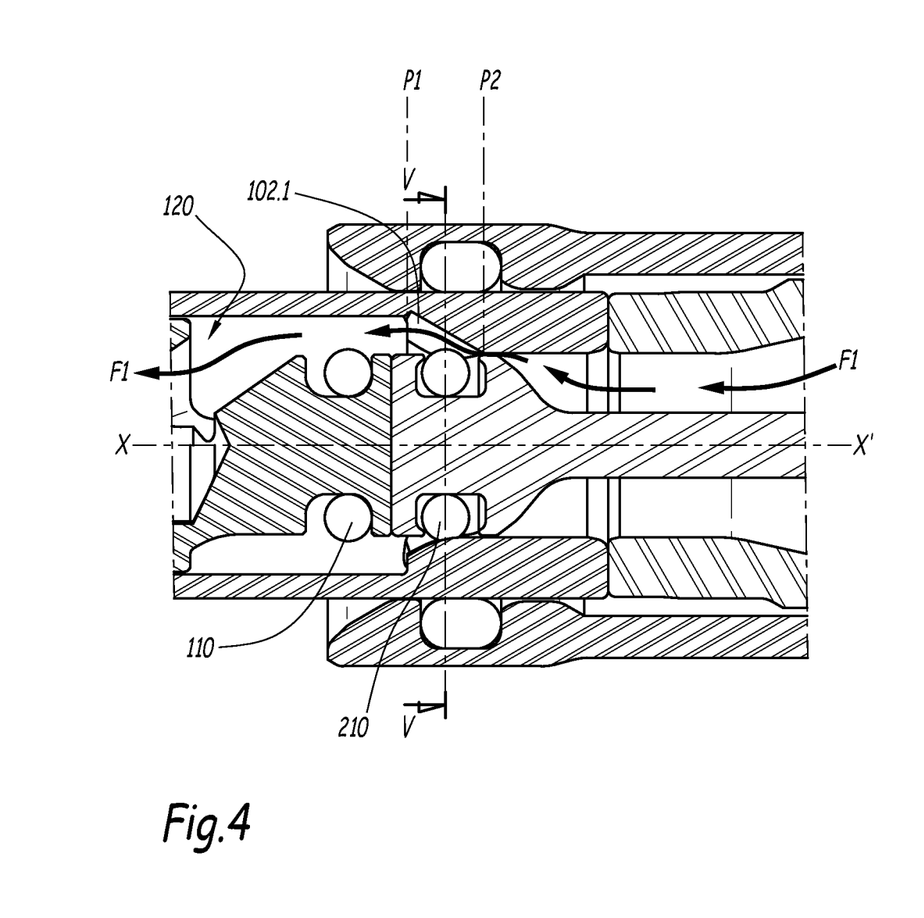
FIG. 4 is a sectional view comparable to that of FIG. 3, in which the two coupling elements are shown in a second subsequent configuration.

The continued coupling brings the coupling into a balancing configuration, shown in FIGS. 4 and 5. This balancing configuration is defined as an intermediate axial position for mutual fitting of the coupling elements between the coupled and uncoupled configurations.

In the balancing configuration, the push-piece head 216 cooperating with the valve 108 has been placed in the mouth 106 in a forward position such that its push-piece gasket 210 is partially in contact with the front cylindrical wall S102i and retained, but a balancing channel 102.1 is formed between the two enclosures 104 and 204 of the coupling elements at the receiving housing of the gasket 210. In other words, the sealing gasket 210 is positioned between the proximal plane P1 and the distal plane P2, while the gasket 110 is inside the cavity 104 of the male element 100, such that a fluid connection is formed between the cavities 104 and 204 of the male and female elements. Therefore, the sealing gasket 210 is only partially in contact, on its outer circumference, with the front cylindrical wall S102i of the male body 102.

The arrows F1 in FIG. 4 show the path of the fluid through the coupling and through the passage channel in the balancing position.

In the example, the aforementioned balancing channel 102.1 comprises six slots. Nevertheless, the number of balancing slots 102.1, their shape, their length and their section can vary to provide an optimal communication phase, improving the opening of the channel less abruptly/ more gently and guaranteeing sufficient contact lines of the "balancing" gasket 210 to keep it in its groove despite the pressures involved.

Therefore, the male valve gasket 110 is no longer in sealed contact with the front cylindrical wall of the body of its sealing seat 122, i.e., with the wall of the mouth 106.

Advantageously, the fluid linking connection between the cavities 104 and 204 of the male and female elements is done sealably relative to the outside, i.e., without leaks to the outside of the assembly formed by the coupling and the two pipes C1 and C2.

Preferably, in the balancing configuration, the inner cylindrical wall S102i of the male body 102 retains (or keeps) the sealing gasket 210 partially in the radial direction. The coupling therefore establishes the pressure while at least one annular segment of the gasket 210 is still in contact with the inner cylindrical wall S102i of the male body 102. In other words, the last gasket 210, providing the sealing of the cavities 104 and 204 in an intermediate coupling phase, is locally maintained during the balancing phase.

Relative to the preceding, the terms "sector", "segment", "angular sector" or "circular segment" refer with the same meaning to an arc of circle, a portion, a section, or an angular part of a gasket or groove (of revolution, circular, toroidal). This is therefore a subpart of an elastomeric gasket (or groove), i.e., of a sample of its perimeter. Typically, a portion refers to an annular section defined between two radial planes separated from one another by a certain angle, corresponding to the angular sector.

Advantageously, the seat 122 of the cavity 104 of the male body 102 is inclined so as to allow a regular increase in the passage section between the gasket segment 210 and the conical section 122 upon coupling, while an angular segment of the gasket 210 is maintained. In a variant, this increase of the passage section comes from the incline of the frustoconical section 232 connecting the head 216 of the central piston (or push-piece) 208 to the rod 218.

The continuation of the coupling movement brings the coupling into the coupled position shown in FIG. 6. In this position, the fluid stream is established (see arrows F2). The gaskets 110 and 210 are exposed to the fluid stream. The critical communication phase having been done with retention of the gasket 210 during a balancing phase, the gaskets can be exposed to the flow rate of the fluid stream without risking being ejected. Thus, the gasket 210 does not resume sealing after the balancing configuration, unlike the known solutions with gasket protection that do not optimize the passage of fluid and make the structure of the coupling more complex. From the end of the balancing phase, the gasket 210 remains exposed to the fluid stream.

The execution speed of the coupling can affect the pressurization phase of the pipe downstream. Therefore, for larger gasket diameters, it can be advantageous to increase the length of the pipe 102.1 in order to guarantee a retention/balancing phase before complete opening.

Figure 7:
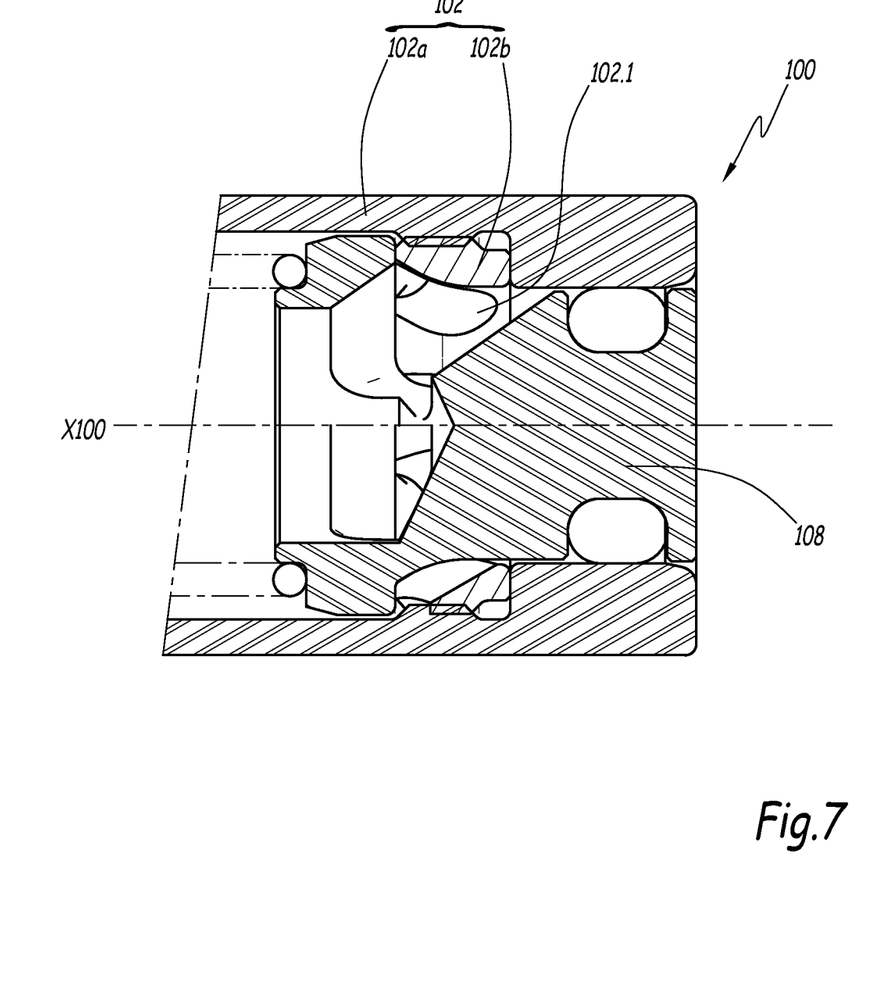
FIG. 7 is a partial sectional view of a coupling element, of the male type, according to a second embodiment of the invention.

FIG. 7 shows a second embodiment of the invention. In this embodiment, the male body 102 is a two-part body, and therefore comprises two parts 102a and 102b.

The channel 102.1, i.e., the slots 102.1, are made in the part 102b, which forms an attached valve seat, which is screwed or stopped axially, for example by means of a shank, at the main part 102a of the male body, which defines the mouth 106.

Figure 8:
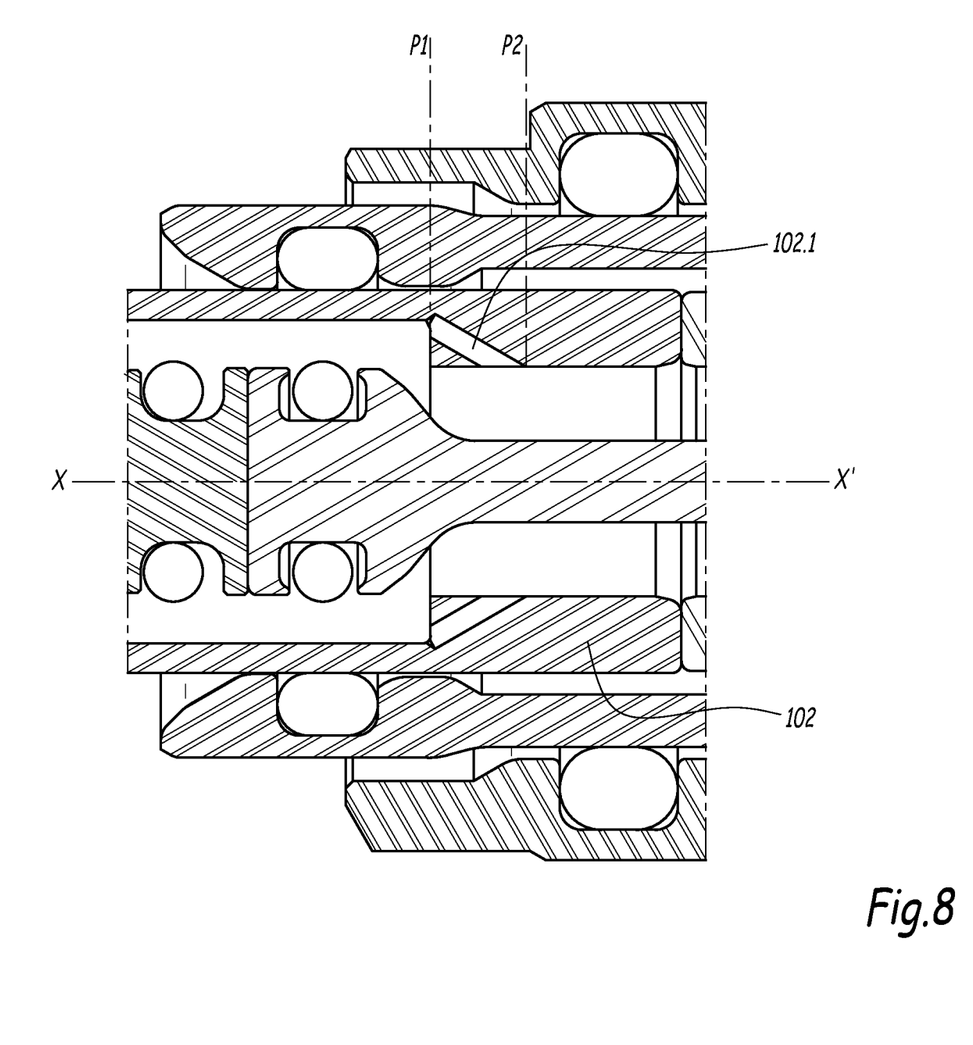
FIG. 8 is a partial sectional view of a coupling according to a third embodiment of the invention, not corresponding to the invention, and in which the two coupling elements are shown in the coupled configuration.

FIG. 8 shows a third embodiment, which does not correspond to the invention, but which could be protected as such. In this embodiment, the slots 102.1 are replaced by oblique openings, which are also referenced 102.1, and which are formed in the male body 102. Therefore, it is understood that the expression "channel" covers both a slot or an opening (hole, piercing).

Like in the first embodiment, the oblique piercings 102.1 extend between a proximal plane P1 and a distal plane P2, which are planes normal to the axis X-X'.

FIGS. 9 to 12 shows a fourth embodiment of the invention. Below, only the differences with respect to the preceding embodiments are described in the interest of concision. Therefore, the same numerical references are used.

This fourth embodiment is the mirror image solution of the first embodiment. Indeed, the gaskets 110 and 210 are inside inner peripheral grooves provided in front of the coupling elements 100 and 200. Specifically, said grooves are defined on the inner radial surface of the male body 102 and on the inner radial surface of the slide valve 212.

Figure 9:
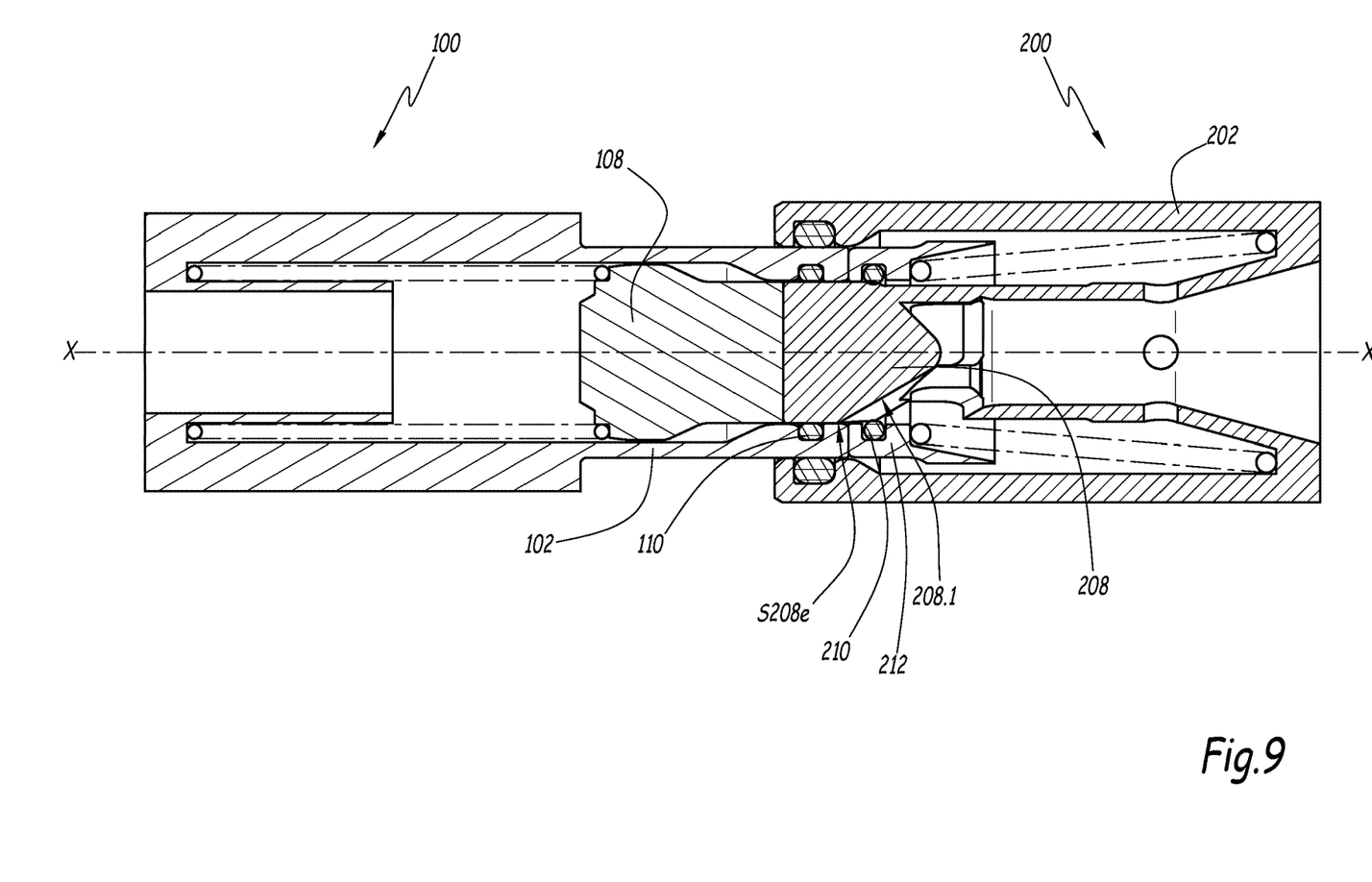
FIG. 9 is a longitudinal sectional view of a coupling according to a fourth embodiment of the invention, and in which the two coupling elements are shown in a first configuration partway between the uncoupled configuration and the coupled configuration.

In particular, in the uncoupled configuration, the gasket 210 comes into radial contact with a part of the outer wall S208e defining the head of the push-piece 208. This part is advantageously cylindrical and has a constant diameter.

The push-piece 208 defines a fluid passage channel 208.1 emerging inside the cavity 204 of the female element. The channel 208.1 also advantageously emerges inside the mouth 206, at the cylindrical part with a constant diameter of the outer wall S208e, which defines the head of the push-piece 208. In particular, the channel 208.1 emerges from the cylindrical part of constant diameter, such that the emerging part of the channel 208.1 is behind the radial contact between the gasket 210 and the cylindrical part of constant diameter when the coupling is in the uncoupled configuration.

The channel is a duct, or local passage, arranged in the push-piece 208 extending longitudinally between the plane P1 and the plane P2, which does not extend laterally over the entire periphery. In other words, the passage channel is defined over only an angular sector of the outer wall S208e of the push-piece 208. "The channel 208.1 extends between the plane P1 and the plane P2" advantageously means that the channel 208.1 connects the plane P1 and the plane P2.

Advantageously, the channel 208.1 is such as a slot formed along the outer wall S208e of the push-piece 208, in particular in front of the push-piece 208, at the push-piece head. Preferably, the channel 208.1 comprises several slots that are formed along the outer wall S208e of the push-piece 208 and that are regularly distributed over the circumference of the wall over different angular sectors to produce a fluid passage.

Figure 10:
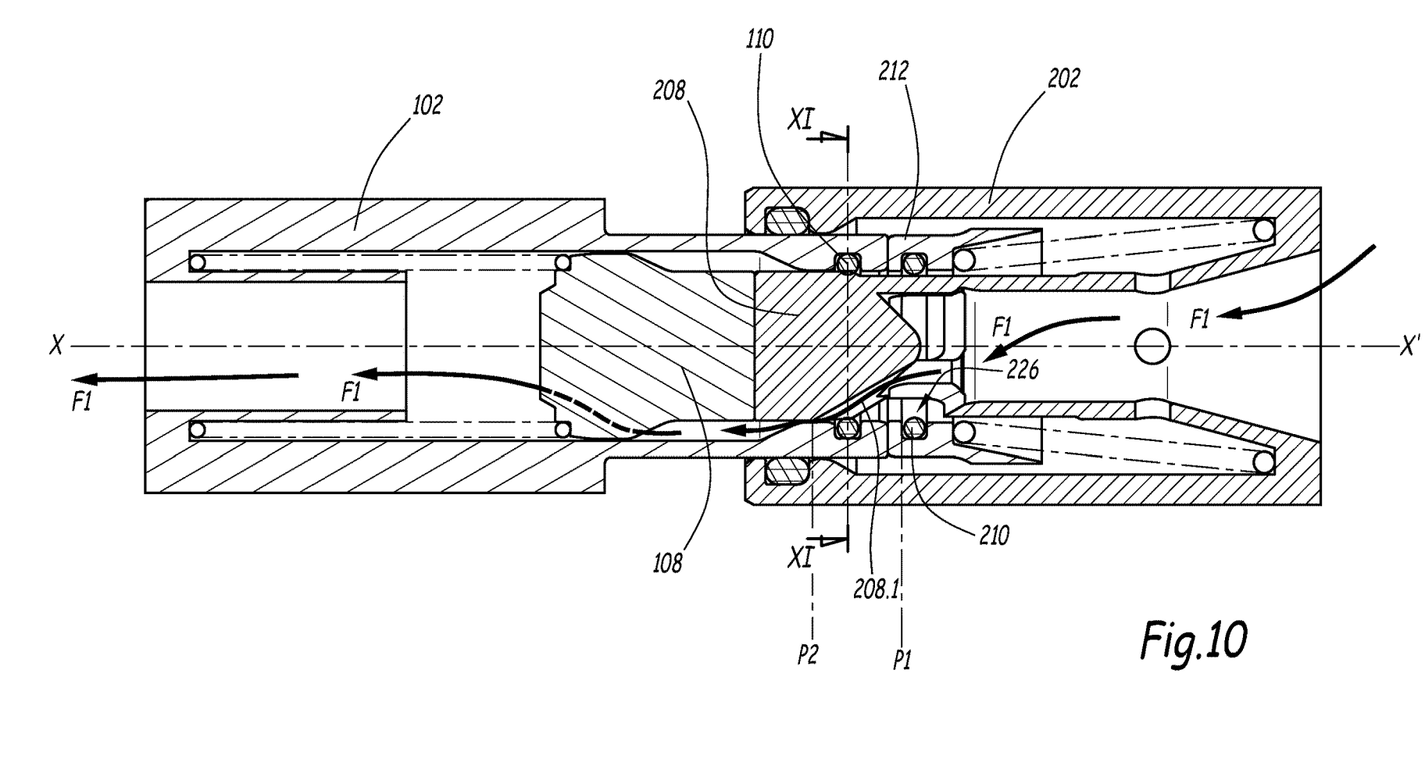
FIG. 10 is a sectional view comparable to that of FIG. 9, in which the two coupling elements are shown in a second subsequent configuration.

The arrows F1 in FIG. 10 show the path of the fluid through the coupling in the balancing position.

Figure 11:
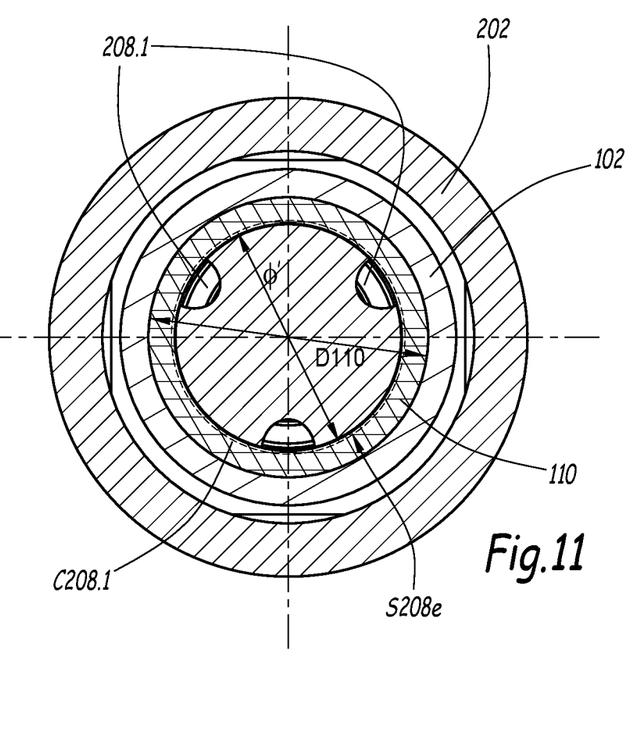
FIG. 11 is a sectional view in the plane of line XI-XI of FIG. 9.

As visible in FIG. 11, each fluid passage channel, such as the slots 208.1, fit inside a circle C208.1 (circle fitted centered on the axis X200), the diameter ø of which is smaller than the diameters D110 and D210 of the sealing gaskets 110 and 210. "Fits inside a circle" here means that in at least one cross-section, it is possible to draw a circle (imaginary), described as fitted circle, that is centered on the longitudinal axis X200 of the coupling element, typically the female element 200, and that surrounds the passage section of each slot 208.1. In the illustration of FIG. 11 for example, there are three slots 208.1 around which it is possible to draw the circle C208.1. Therefore, the surfaces and the lines of the passage channel, i.e., of the slots, defined in the coupling body, are delimited relative to a circle and defined inside this circle. In FIG. 11, the slot outer edges are for example equidistant from the central axis X200 of the coupling element, such that it is possible to define a fitted circle C208.1 that intersects the set of edges of the slots.

In an alternative (not shown), it is possible to define a circle centered on the axis that intersects at least one outer edge of a fluid passage slot, typically the edge of the slot furthest from the axis, among the slots, as far or less far from the axis.

In this embodiment, and in particular in the balancing position, the sealing gasket 110 is positioned between the proximal plane P1 and the distal plane P2, while the other gasket 210 is inside the cavity 204 of the female element, such that a fluid connection is formed between the cavities 104 and 204 of the male and female elements. Therefore, the sealing gasket 110 is only partially in contact, on its inner circumference, with the outer cylindrical wall S208e of the push-piece 208.

As a result, in the balancing configuration, the outer cylindrical wall S208e of the push-piece 208 partially retains the first sealing gasket 110 in the radial direction.

Furthermore, the central push-piece 208 of the female element is hollow and comprises a radial opening 226 behind the passage channel 208.1. In particular, it connects the pipe to the enclosure of the coupling between three distal openings, and a rear central mouth so as to conduct the fluid stream between the two coupling elements. This radial opening emerges at a surface of the push-piece 208, which has a smaller diameter relative to the diameter of the outer cylindrical wall S208e in front of the push-piece, provided to maintain the sealed contact with the gasket 210 in the uncoupled configuration of the male and female elements.

Figure 12:
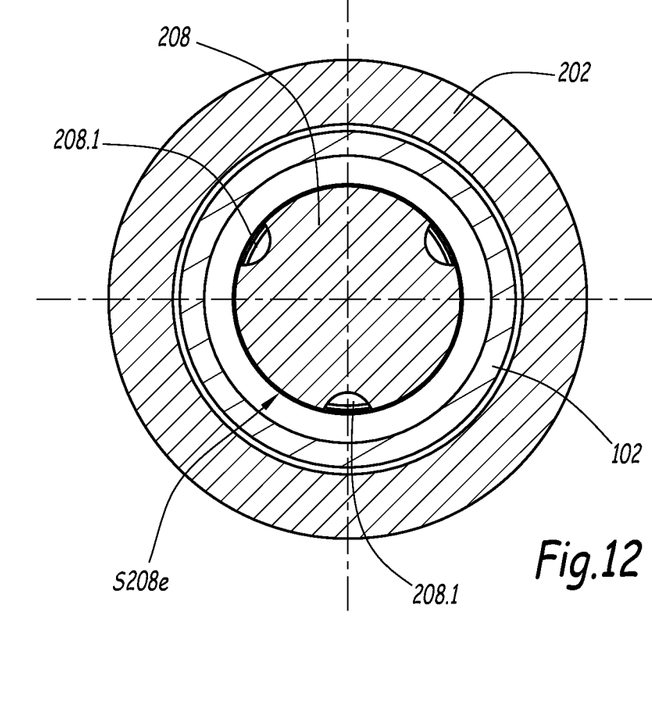
FIG. 12 is a sectional view comparable to that of FIG. 11, in which the coupling is in the coupled configuration, the section plane of FIG. 12 being slightly axially offset relative to that of FIG. 11.

The push-piece 208 and the body 202 here form only one single part. In the coupled position, the inner gaskets of the male body 102 and the slide valve 212, respectively 110 and 210, benefit from little play with the outer surface of the push-piece 208.

In a variant that is not shown, applicable to the fourth embodiment, the push-piece 208 is solid (and not hollow), like for example in the first embodiment of the invention. Therefore, the inner gasket 110 of the male body 102 and the inner gasket 210 of the slide valve 212 would be kept in the fluid stream in the coupled position of the coupling. Indeed, according to this variant, the fluid passes around the push-piece 208, and no longer inside the latter, such that the gaskets 110 and 210, which are also arranged around the push-piece 208, are directly in contact with the fluid stream.

Depending on the shape of the slots 102.1 or 208.1, the gasket 210 or 110 can have several angular segments in the fluid stream while several angular segments are still retained by a contact surface, based on the number of balancing slots.

A slot refers to a notch, an open channel, a crack, an indentation or any comparable machining arranged along the inner cylindrical wall of the male body 102 or along the outer cylindrical wall of the push-piece 208, and performing the function of the described passage channel.

According to another variant, in the balancing configuration of the first gasket or the second gasket is respectively retained by an inner cylindrical surface of the male body or by an outer cylindrical surface of the push-piece with a slightly smaller play than the thickness of the gasket, for example e/2.

According to another variant that is not shown, the coupling is of the coaxial type, for fluid conduit applications between two coaxial coupling elements.

According to another variant that is not shown, the coupling gaskets can be overmolded gaskets, or adhered by overmolding.

According to another variant that is not shown, the coupling comprises a system for locking the male and female elements the coupled configuration, such as a ball locking system.

According to another variant that is not shown, the diameters D204 and D206, respectively of the cavity 204 and the distal mouth 206 of the female body 202, are equal.

The features of the embodiments of the figures and the variants not shown considered above may be combined with one another to create new embodiments of the invention.

The invention claimed is:

1. A quick coupling for the detachable connection of two pipes through which a pressurized fluid flows, made up of a male element and a female element able to receive the male element by fitting along a longitudinal axis between an uncoupled configuration and a coupled configuration of the coupling,
   the male element comprising:
       a cylindrical male body, defining a longitudinal cavity and a distal mouth, the diameter of which is smaller than that of the cavity,
       a valve movable axially inside the cavity, between a forward position in which the valve closes off the mouth and a withdrawn position in which the valve does not close off the mouth, and a first sealing gasket that is borne by the male body or the valve, and which bears respectively on the valve or on an inner cylindrical wall of the male body, and the female coupling element comprising:
a cylindrical female body, defining a longitudinal cavity and a distal mouth, the diameter of which is smaller than or equal to that of the cavity,
a push-piece, and
a slide valve, which is arranged radially between the female body and the push-piece and which is movable axially inside the longitudinal cavity between a forward position, in which the slide valve closes off the mouth, and a withdrawn position, in which the slide valve does not close off the mouth, and
a second sealing gasket that is borne by the slide valve or the push-piece, and which bears respectively on an outer cylindrical wall of the push-piece or on the slide valve,
wherein:
the male body or the push-piece delimits a fluid passage channel connecting the inside of the cavity to the distal mouth, respectively of the male element or the female element,
the passage channel, emerging inside the cavity of the male element or the female element, fits inside a circle, the diameter of which is respectively larger or smaller than that of the first and second sealing gaskets,
the channel extends between two planes that are perpendicular to the longitudinal axis, respectively between a proximal plane and distal plane, which are offset relative to one another along the longitudinal axis,
the channel is a slot along the outer cylindrical wall of the push-piece or along the inner cylindrical wall of the male body.

2. The quick coupling according to claim 1, wherein the proximal plane and the distal plane are respectively defined at the cavity and the distal mouth of the male or female element.

3. The quick coupling according to claim 1, wherein in a balancing configuration of the coupling, defined by fitting between the coupled configuration and the uncoupled configuration, one of the gaskets from among the first sealing gasket and the second sealing gasket is arranged between the proximal plane and the distal plane, while the other gasket is inside the cavity of the corresponding male or female element, such that a fluid connection is formed between the cavities of the male and female elements.

4. The quick coupling according to claim 3, wherein the fluid connection between the cavities of the male and female elements is done sealably relative to the outside.

5. The quick coupling according to claim 1, wherein in a balancing position of the coupling, defined between the coupled and uncoupled configurations, the outer cylindrical wall of the push-piece or the inner cylindrical wall of the male body respectively partially retains the first sealing gasket or the second sealing gasket in the radial direction.

6. The quick coupling according to claim 1, wherein the channel extends at least partially along a frustoconical part of the male body or the push-piece.

7. The quick coupling according to claim 1, wherein several slots are formed along the outer cylindrical wall of the push-piece or the inner cylindrical wall of the male body and are regularly distributed over the circumference of the wall.

8. The quick coupling according to claim 1, wherein the two distal and proximal planes are offset from one another by a distance corresponding to at least a toroid thickness of the first or second sealing gasket.

9. The quick coupler according to claim 1, wherein the two proximal and distal planes are offset from one another by a distance corresponding to one, two, three or four toroid thicknesses.

10. The quick coupling according to claim 1, wherein the push-piece is hollow and comprises a radial opening behind the channel.

11. The quick coupling according to claim 1, wherein the push-piece comprises, in front, a push-piece head able to maintain sealed contact with the valve in the uncoupled position of the coupling and, behind, a tubular part whereof the diameter is smaller than that of the head.

12. The quick coupling according to claim 1, wherein when the male and female elements are in the uncoupled configuration, the first sealing gasket or the second sealing gasket is respectively in contact with the inner cylindrical wall of the male body or the outer cylindrical wall of the push-piece, in front of the distal plane.

13. The quick coupling according to claim 1, wherein the front faces of the male body and the valve, as well as the front faces of the push-piece and the slide valve, are coplanar when the male and female elements are in the uncoupled configuration.

* * * * *